United States Patent [19]

Lindsay et al.

[11] Patent Number: 5,495,109
[45] Date of Patent: Feb. 27, 1996

[54] ELECTROCHEMICAL IDENTIFICATION OF MOLECULES IN A SCANNING PROBE MICROSCOPE

[75] Inventors: Stuart M. Lindsay; Tianwei Jing, both of Tempe, Ariz.

[73] Assignee: Molecular Imaging Corporation, Tempe, Ariz.

[21] Appl. No.: 399,968

[22] Filed: Mar. 7, 1995

Related U.S. Application Data

[63] Continuation-in-part of Ser. No. 388,068, Feb. 10, 1995.

[51] Int. Cl.[6] .................................................. H01J 37/252
[52] U.S. Cl. .................................... 250/306; 250/307
[58] Field of Search .................................. 250/306, 307;
73/105; 204/153.1, 406

[56] References Cited

U.S. PATENT DOCUMENTS

| Re. 34,708 | 8/1994 | Hansma et al. | 250/306 |
|---|---|---|---|
| 4,823,004 | 4/1989 | Kaiser et al. | 250/306 |
| 4,868,396 | 9/1989 | Lindsay | 250/440.1 |
| 4,956,817 | 9/1990 | West et al. | 365/189.01 |
| 4,968,390 | 11/1990 | Bard et al. | 204/15 |
| 4,969,978 | 11/1990 | Tomita et al. | 204/153.1 |
| 5,003,815 | 4/1991 | Martin et al. | 736/105 |
| 5,018,865 | 5/1991 | Ferrel et al. | 356/376 |
| 5,120,959 | 6/1992 | Tomita | 250/306 |
| 5,155,361 | 10/1992 | Lindsay | 250/307 |
| 5,202,004 | 4/1993 | Kwak et al. | 204/153.1 |
| 5,314,829 | 5/1994 | Coles | 436/165 |
| 5,329,514 | 7/1994 | Eguchi et al. | 369/126 |
| 5,363,697 | 11/1994 | Nakagawa | 73/105 |
| 5,388,452 | 2/1995 | Harp et al. | 73/105 |

OTHER PUBLICATIONS

"Novel Stationary–Sample Atomic Force Microscope with Beam–Tracking Lens"; P. S. Jung and D. R. Yaniv; Feb. 4, 1993; Electronic Letters, vol. 29, No. 3, pp. 264–265.
"Mechanical Relaxation of Organic Monolayer Films Measured by Force Microscopy"; Joyce, et al.; May 4, 1992; Physical Review Letters, vol. 68, No. 18 The American Physical Society, pp. 2790–2793.
"Imaging Crystals, Polymers, and Processes in Water with the Atomic Force Microscope"; Drake et al.; Science, vol. 243; Mar. 1989; pp. 1586–1589.
"Atomic Resolution Microscopy in Water"; Sonnenfeld, et al; Science, Reprint Series, Apr. 11, 1986, vol. 232 pp. 211–213.

(List continued on next page.)

Primary Examiner—Jack I. Berman
Assistant Examiner—Kiet T. Nguyen
Attorney, Agent, or Firm—D'Alessandro & Ritchie

[57] ABSTRACT

A method and apparatus for high resolution mapping of the chemical composition of a thin film utilizes scanning probe microscopy techniques. The sample to be studied is prepared as a thin film disposed on a conductive backing electrode. A sensitive electrometer is connected to the backing electrode to detect current passing through it. According to a first aspect of the invention, a force sensing cantilever is scanned relative to the sample surface a plurality of times. Topographic information about the sample surface is obtained in a conventional manner by studying deflections of the cantilever or feedback current used to minimize deflections of the cantilever. Simultaneously, a voltage is applied to the probe tip. This voltage, through a tunneling current to the backing electrode, causes reduction and/or oxidation reactions in the sample surface. On successive scans, different voltages may be used. In this way, the tunneling current at each of a number of different voltages for each location in the sample surface is obtained. Because specific oxidation and reduction reactions take place only at well defined voltages, it is possible, from the current measured at a certain location and a certain applied voltage at that location, to deduce what the chemical located at that location is. According to a second aspect of the invention, a scanning tunneling microscope mechanism may be used instead of a force sensing mechanism.

28 Claims, 4 Drawing Sheets

OTHER PUBLICATIONS

"A new symmetric scanning tunneling microscope design"; Davidson, et al.; Journal of Vacuum Science & Technology: Part A, (1988) Mar./Apr., No. 2.

"Atomic force microscopy of liquid–covered surfaces: Atomic resolution images"; Marti, et al.; Applied Physics Letters, 51 (7), Aug. 17, 1987, American Institute of Physics, pp. 484–486.

"Low–temperature atomic force microscopy"; Kirk, et al; Review of Scientific Instruments, 59 (6) Jun. 1988, American Institute of Physics, pp. 833–835.

"Semiconductor topography in aqueous environments: Tunneling microscopy of chemomechanically polished (001) GaAs"; Sonnenfeld, et al. Applied Physics Letters, 50, Jun. 15, 1987, American Institute of Physics, pp. 1742–1744.

"Chemical Applications of Scanning Tunneling Microscopy"; West, et al.; IBM Journal of Research Development, vol. 30, No. 5, Sep. 1986, pp. 484–490.

"Determination of Lubricant Film Thickness on a Particulate Disk Surface by Atomic Force Microscopy"; Mate, et al., IBM Research Division, Magenetics Recording; Apr. 25, 1989.

"Atomic Force Microscope–Force Mapping and Profiling on a sub 100–A Scale"; Martin, et al.; Journal of Applied Physics, 61(10) May 15, 1987, American Institute of Physics, pp. 4723–4729.

"The Adsorption of Organic Molecules"; Damaskin, et al.; Institute of Electrochemistry, Academy of Sciences; pp. 353–395; (date unknown).

"Scanning Tunneling Microscopy on Biological Matter", Travaglini, et al.; Surface Science (1987) pp. 380–390.

"True Atomic Resolution by Atomic Force microscopy Through Repulsive and Attractive Forces"; Ohnesorge, et al; IBM Research Division, Science, vol. 260, Jun. 4, 1993; pp. 1451–1456.

"Simultaneous measurement of tunneling current and force as a function of position through a lipid film on solid substrate" Specht, et al.; Elsevier Science Publishers, B.V.; Surface Science Letters, Jul. 22, 1991.

"Atomic Force Microscope"; Hansma, et al. Journal of Applied Physics, 76 (2) Jul. 15, 1994, American Institute of Physics, pp. 796–799.

"Resonant Tunneling Bands and Electrochemical Reduction Potentials"; Mazur, et al. Abstract, Washington State University, pp. 1–16; Dec. 6, 1994; (unpublished).

"Atomic Force Microscopy of Local Compliance at Solid–Liquid Interfaces"; Shea, et al.; Abstract, Cambridge University; pp. 1–13; (unpublished).

"Viscoelasticity of living cells allows high–resolution imaging by tapping mode atomic force microscopy"; Putman, et al.; Department of Applied Physics, University of Twente, (unpublished).

ELECTROCHEMICAL IDENTIFICATION OF MOLECULES IN A SCANNING PROBE MICROSCOPE

CROSS-REFERENCE TO RELATED APPLICATION

This application is a continuation-in-part of U.S. patent application Ser. No. 08/388,068 filed Feb. 10, 1995, entitled "Scanning Probe Microscope For Use in Fluids", in the name of the same inventors and assigned to the same entity. It is hereby incorporated herein by reference as if set forth fully herien.

BACKGROUND OF THE INVENTION

1. Field of the Invention

This invention relates to scanning probe microscopes, in particular the scanning tunneling microscope (STM) and the atomic force microscope (AFM). Identification of the chemical composition of areas in a microscope image has been very difficult in the past. Certain elements can be identified by their characteristic x-ray emission in an electron microscope. In the case of the STM, identification has been limited to certain atoms which induce well-understood surface states near the Fermi energy (the energy of the tunneling electrons). In the case of the AFM, certain discrimination between the composition of molecular adlayers has been possible, based on differences in friction between the adlayers and the scanning tip. In the present invention, we exploit the ability of a conductive tip to transfer charge to and from molecules in surfaces at well defined potentials (being the electrochemical reduction or oxidation potentials). The present invention permits discrimination among, and identification of electroactive molecules on the surface of a sample. The present invention provides the first known method for identification of organic molecules in a microscope with nanometer scale resolution.

2. The Prior Art

The scanning tunneling microscope (STM) is capable of atomic-resolution imaging of a conductive surface [Binnig, G. and Rohrer, H., Reviews of Modern Physics, vol. 59, pp. 615–626, 1987]. The atomic force microscope can image single atoms in an insulating surface [Ohnesorge, F. and Binnig, G., Science vol. 260, pp. 1451–1456, 1993]. However, neither technique is well suited to identification of the composition of material in the gap formed between the probe and an underlying substrate. In the case of the STM, current is carried by electrons in the itinerant states of the metals that constitute the tip or substrate. The composition of some intervening material is only of significance to the extent that it modifies the properties of those states. In certain very special cases, it has proved possible to identify surface atoms, based on the manner in which they modify the current carrying states near a surface [Feenstra et al., Physical Review Letters, vol. 58, pp. 1192–1195, 1987]. In the case of the AFM, the intervening material plays a role in the friction between the scanning probe when there are chemically-specific interactions between the scanning probe and molecules under the probe, a phenomenon that has been used to distinguish (but not identify) regions of different chemical composition in a thin film [Overney et al., Nature, 359, pp. 133–135, 1992].

An alternative approach to chemical identification uses thin films sandwiched between metal electrodes. A voltage is applied between the electrodes so as to raise the energy of the electrons in one electrode with respect to the other electrode. When the energy of electrons in one electrode is coincident with an electronic state of a molecule in the thin film between the electrode, an enhanced current flow occurs because of the process of resonant tunneling, a quantum-mechanical phenomenon in which the intermediate state in the gap serves to transport extra current. Because the energy of the molecular state is characteristic of the chemical species in the gap between the electrodes, the voltage at which this extra current flows is characteristic and could, in principle, be used to identify the chemical species. FIG. 1 shows a schematic arrangement of such a solid-state tunnel junction 10. A voltage V is applied by device 12 across two metal electrodes, 14 and 16. Each electrode is coated with a thin insulating film (such as an oxide layer) 18 and 20 and a layer of molecules 22. A sensitive current measuring device 24 records the current through the device. FIGS. 2A and 2B show the energy of the electrons in the electrodes of FIG. 1 schematically in two configurations: FIG. 2A is a diagram of voltage conditions where there is no extra current due to resonant tunneling. The voltage applied across the device, $V_1$ is too little to raise the energy of the electrons in electrode 14 so as to be coincident with the energy of the molecular state $E_M$. FIG. 2B is a diagram of the situation when the voltage is adjusted to resonance. The electrons that carry current from electrode 14 now have an energy equal to $E_M$. The voltage, $V_2$ at which the extra current "turns on" serves to identify the molecule in the gap. A diagram of the current-voltage characteristic of such a device is shown in FIG. 3. Conventionally, the step at $V_2$ is detected by plotting the first or second derivative of the current so that features are made sharper.

While the above description has long been supposed to apply to tunneling through molecules, some recent work shows that the situation is both more complex, and yet more tractable in terms of achieving the desirable goal of identifying a broad range of molecules by such a mechanism. Mazur and Hipps [Journal of Physical Chemistry, submitted, 1994] have measured the current-voltage characteristics of a number of devices containing different organic molecules with states that lie some electron volts from the energy of the electrons with no voltage applied across the device. They have extracted the value of the voltage at which the extra current turns on ($V_2$ in FIG. 3) for a number of different organic molecules. They find that the energy of the state, $E_M$, at which increased current flow is detected, is not the energy that would be measured for the same molecule in the gas phase. It is, instead, the energy of the final state that occurs when the molecule is electrochemically reduced or oxidized. This is different from the energy of the isolated molecule for two reasons. First, oxidation or reduction involves charging of the molecule, a process that changes the energy of the states of the molecule. In contrast, in resonant tunneling, the process described above, the electron does not interact with the molecule for long enough to change its energy. Second, the charged molecule is embedded in a dielectric medium. In this case it is the insulating films 18, 20 and other molecules that constitute the dielectric, but in an electrochemistry experiment, it is the solvent used to dissolve the molecules. In either case, the medium polarizes so as to reduce the energy of the charged state. This final step is called 'relaxation'. In any case, the charging (reduction) or discharging (oxidation) of a molecule in a medium is a much more complex process than resonant tunneling. However, the magnitude of the energy shift caused by relaxation is usually big; i.e., many electron volts, so that the states associated with oxidized or reduced molecules lie closer to the energy of the electrons in the metal than the original, unperturbed, states of the molecule. More importantly, from the standpoint of the present invention, these state-energies are easily measured by the conventional methods of electrochemistry. Many sources list standard reduction and oxidation potentials for organic compounds.

Electrochemical potentials are conventionally stated as potentials relative to the electrochemical potential of a standard 'reference electrode'. Thus, identification of molecules via their reduction or oxidation potentials would seem to require an electrochemical cell containing such an electrode as a reference. However, these reference electrodes function because their potential is fixed. That is to say, a certain fixed amount of work would have to be done to remove an electron from such an electrode to a position at rest far from the electrode. This quantity is the work function of the reference electrode. It is illustrated schematically in FIG. 4 where the energy to take an electron from the reference electrode is labeled $\phi_{REF}$. The (known) oxidation and reduction potentials are labeled $E_{RER}(OX)$ and $E_{RER}(RED)$. The work function of the metal used for an electrode in a tunneling device is also usually a known quantity, $\phi_{METAL}$. Thus, the voltage for reduction ($V_2(RED)$) or oxidation ($V_2(OX)$) of molecules in a device like that shown in FIG. 1 can be calculated if $\phi_{REF}$ is known. The standard for reference electrodes is the Normal Hydrogen Electrode, NHE, and values for the potential of other reference electrodes relative to the NHE are well known. The work function of the NHE, $\phi_{NHE}$, is still the subject of some debate, although 4.8 eV is the currently accepted value [Trasatti, S., Advances in Electrochemistry, ed. H. Gerischer, C. W. Tobias, Wiley InterScience, New York, pp. 213–321].

Mazur and Hipps have used the value of $\phi_{NHE}$=4.8 eV together with the known oxidation and reduction potentials of several organic molecules and the work function of lead (4.1 eV) to calculate the reduction potential for these molecules between lead electrodes in a device such as that shown in FIG. 1. The potential is calculated as $V_2(RED)$, the voltage that would have to be applied to the device in order to see a step-like increase in current due to the reduction of the molecules. TABLE 1 includes a listing of the calculated $V_2(RED)$, and the measured voltage, $V_2$, at which a step occurs in the current for six organic molecules.

TABLE I

| Molecule | $V_2$ (RED) Calculated (Volts) | $V_2$ Measured (Volts) |
|---|---|---|
| Ni(acac)$_2$ | 2.47 | 2.50 |
| coronene | 2.62 | 2.51 |
| anthracene | 2.80 | 2.74 |
| perylene | 3.00 | 2.91 |
| tetracene | 3.12 | 3.11 |
| pentacene | 3.40 | 3.47 |

On the whole, there is rather good agreement between the calculated and measured values. Thus, this step in current at $V_2$ serves as a marker that may be used to identify the organic compound. Clearly, this method can be extended to other organic compounds and other electrodes. Compounds that are reduced at more negative potentials could be studied on electrodes with larger work functions. Thus, this method of chemical identification is applicable to any compound that can be reduced (or oxidized) on any metal suitable for use as an electrode.

The limitation of the prior art is that, in order to carry out identification of molecules, they must be somehow inserted into a device of the general layout shown in FIG. 1. This is not easy to do and not very useful once done, for one must usually know the chemistry of the molecules in advance in order to make a device such as that shown in FIG. 1.

SUMMARY OF THE INVENTION

The present invention provides a method and apparatus for high resolution mapping of the chemical composition of a thin film using scanning probe microscopy techniques. The sample to be studied is prepared as a thin film disposed on a conductive backing electrode. A sensitive electrometer is connected to the backing electrode to detect current passing through it. According to a first aspect of the invention, a force sensing cantilever is scanned relative to the sample surface a plurality of times. Topographic information about the sample surface is obtained in a conventional manner by studying deflections of the cantilever or feedback current used to minimize deflections of the cantilever. Simultaneously, a voltage is applied to the probe tip. This voltage, by means of a tunneling current to the backing electrode, causes reduction and/or oxidation reactions in the sample surface. On successive scans, different voltages may be used. In this way, the tunneling current at each of a number of different voltages for each location in the sample surface is obtained. Because specific oxidation and reduction reactions take place only at well defined voltages, it is possible, from the current measured at a certain location and a certain applied voltage at that location, to deduce what the chemical located at that location is. According to a second aspect of the invention, a scanning tunneling microscope mechanism may be used instead of a force sensing mechanism.

OBJECTS AND ADVANTAGES OF THE INVENTION

Accordingly, it is an object of the present invention to provide a microscope which can determine the chemical composition of regions of a sample surface.

It is a further object of the present invention to provide a microscope in which the chemical composition of a thin film is mapped with high resolution.

It is a further object to provide a microscope that will map the chemical composition of the surface of an insulating film.

Still another object of the present invention is to provide a microscope that will provide a simultaneous topographical and chemical display of the surface of a sample under examination.

These and many other objects and advantages of the present invention will become apparent to those of ordinary skill in the art from a consideration of the drawings and ensuing description of the invention.

DESCRIPTION OF THE PREFERRED EMBODIMENTS

Those of ordinary skill in the art will realize that the following description of the present invention is illustrative only and is not intended to be in any way limiting. Other embodiments of the invention will readily suggest themselves to such skilled persons from an examination of the within disclosure.

Figure 1:
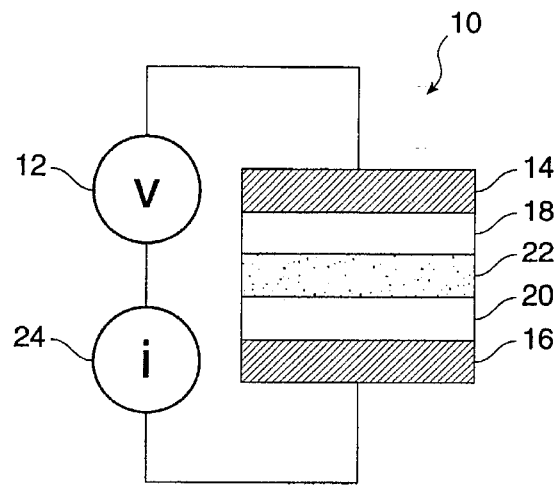
FIG. 1 is a schematic diagram of a solid state tunnel junction according to the prior art.
Figure 2A:
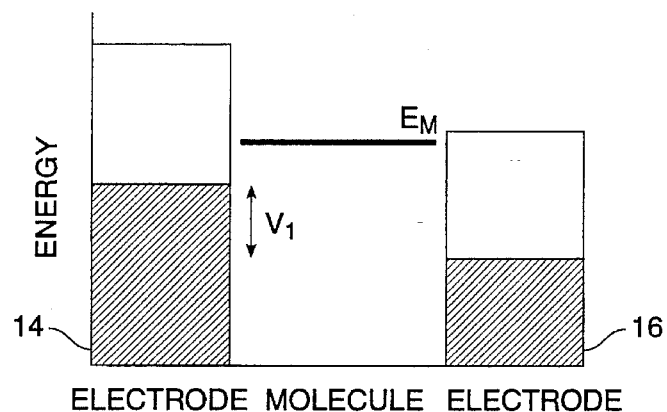
FIG. 2A is a diagram showing energy levels in a tunnel junction according to FIG. 1 with the tunnel junction not in a resonance condition.
Figure 2B:
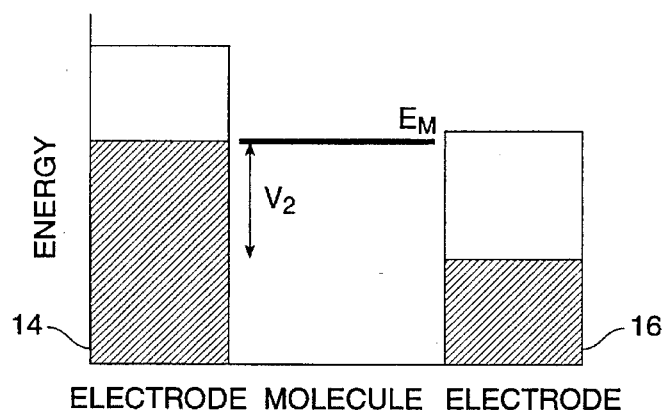
FIG. 2B is a diagram showing energy levels in a tunnel junction according to FIG. 1 with the tunnel junction in a resonance condition.
Figure 3:
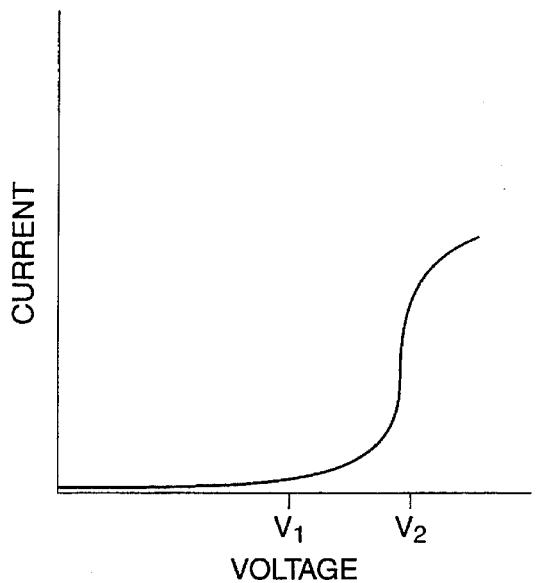
FIG. 3 is a current-voltage characteristic for the tunnel junction of FIG. 1.
Figure 4:
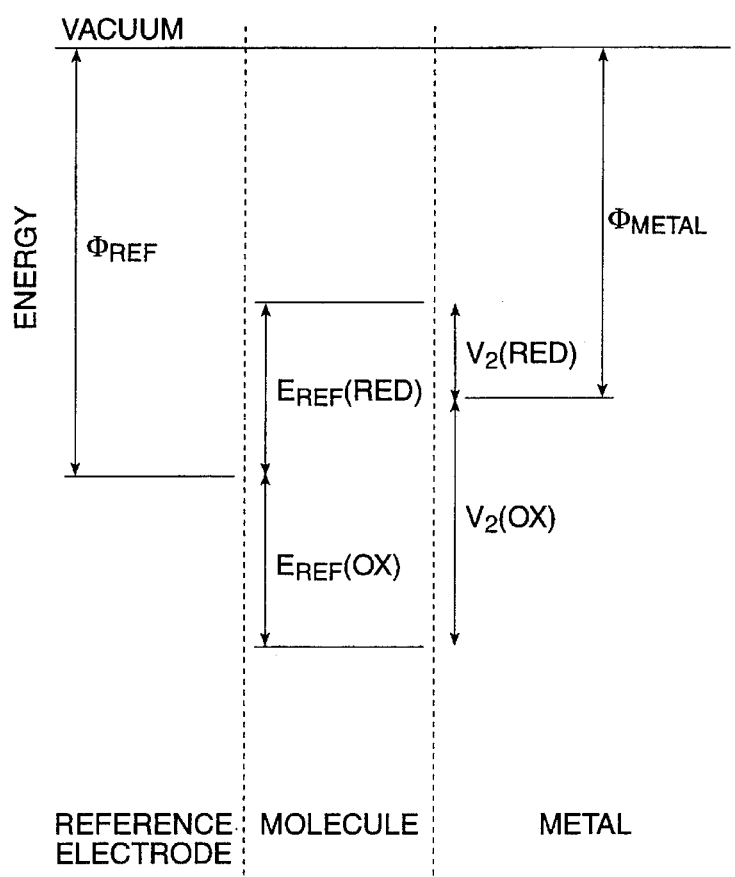
FIG. 4 is an energy diagram showing the energy levels of a reference electrode, molecular oxidation and reduction states and the work function of a metal electrode.
Figure 5:
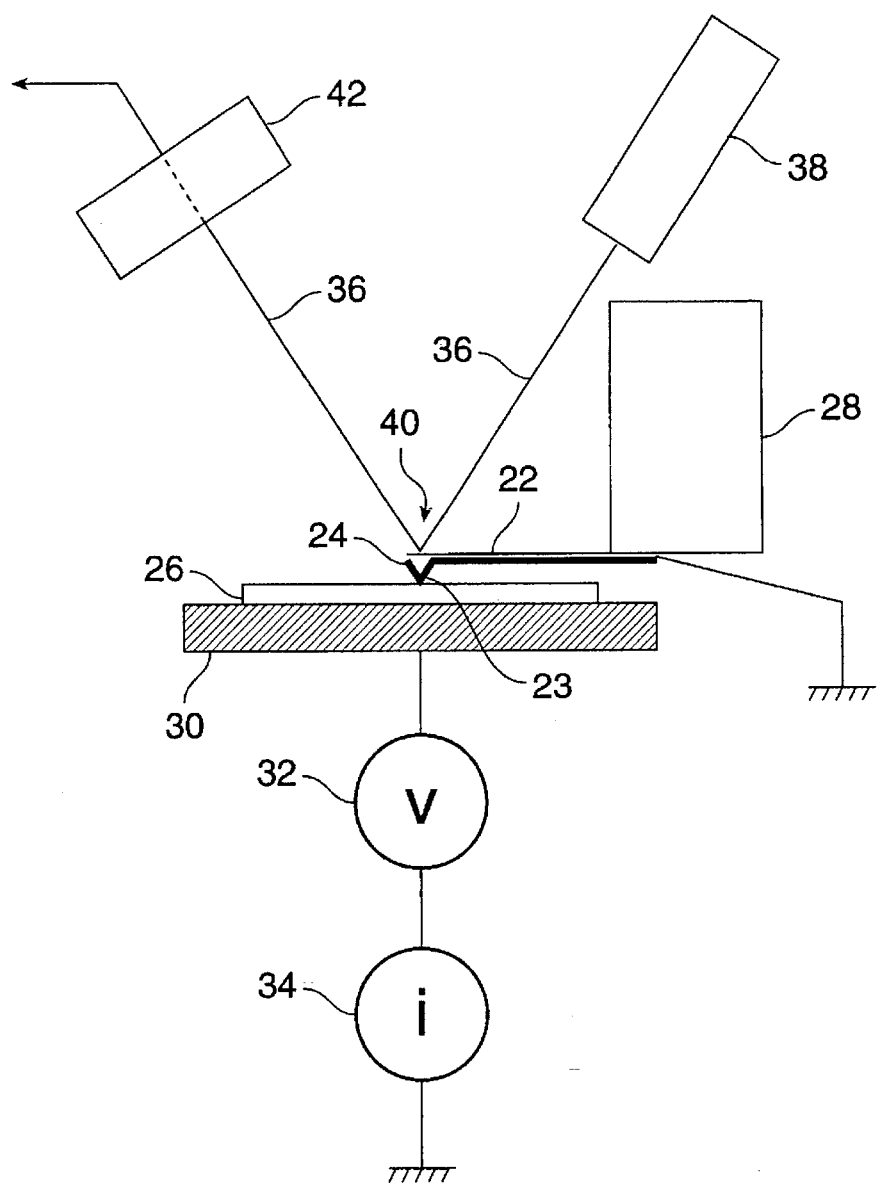
FIG. 5 is a schematic diagram of a scanning force microscope according to the present invention.

The essential elements of the microscope according to the present invention are shown in FIG. 5. A force sensing cantilever (such as those sold by Park Scientific Instruments of Sunnyvale, Calif.) 22 with a probe tip 23 is coated with a thin metal film, 24. In the preferred embodiment, the cantilevers are DC ion-sputter coated. A thin layer (a few angstroms) of chrome is first applied to improve adhesion of subsequent coatings. Next, a layer of several hundred angstroms of gold is sputtered onto the cantilevers. DC ion-sputter coated films generate less film stress and do not bend the force sensing cantilevers significantly. The cantilever is scanned over the upper surface of the sample 26 in a raster or equivalent pattern by the scanner 28 which also adjusts the height of the cantilever 22 above the surface 26. According to a preferred embodiment of the present invention, the cantilever 22 is grounded. This eliminates leakage of the high voltage signals used in the scanner 28 (typically a piezoceramic transducer controlled by high voltage signals).

Other metals besides gold may be used. If freshly prepared, even quite reactive metals will only oxidize to a depth of a few angstores, so they are still useful as tunneling electrodes. The advantage of using another metal is that the onset currents for oxidation or reduction are all shifted by the amount by which the work function differs. The data shown in Table I are for lead electrodes, for which the work function is 4.1 eV. Gold electrodes have a work function of 5.2 eV, so the voltages listed in Table 1 would all be reduced by 1.1 volts. That is, in a gold-gold electrode system, the measured voltages would be 1.4 V for Ni(acac)$_2$, 1.41 V for coronene, 1.64 V for anthracene, 1.81 V for perylene, 2.01 V for tetracene and 2.37 V for pentacene. Changing the electrode metals serves two functions: (1) it can be used to confirm assignments made with the electrode system and (2) the range of materials that can be analyzed in a given range of applied voltages can be extended by as much as the work function of the electrodes can be changed. Data for work functions for various metals can be found, for example, in the CRC Handbook of Chemistry and Physics (CRC Press, Boca Raton, Fla.).

The sample 26 is prepared in the form of a thin film with a conductive backing 30 as described further below. The conductive backing of "back electrode" 30 is connected into a sensitive electrometer 34 (capable of detecting electrical currents as low as 0.01 pA) and a bias voltage 32 applied to the backing electrode 30 (effectively between the probe tip 23 and the backing electrode 30). Displacements of the force-sensing cantilever 22 are sensed by deflection of a laser beam 36 from a laser 38 which is reflected off the back 40 of the cantilever 22 and into a position-sensitive detector 42.

The detailed layout of a microscope which incorporates most of these features is described in our co-pending U. S. patent application Ser. No. 08/388,068, referred to above. In particular, it is important that the sample surface 26 is clean and free of water. This is required to prevent unwanted electrochemical reactions that limit the range of potential that can be applied across the sample. This is achieved in the present invention by enclosing the sample area in a hermetically-sealed chamber such as that described in the above-referenced U.S. patent application Ser. No. 08/388,068. Inert gasses, such as argon, may be flowed through the chamber in order to keep the sample dry and clean.

Figure 6:
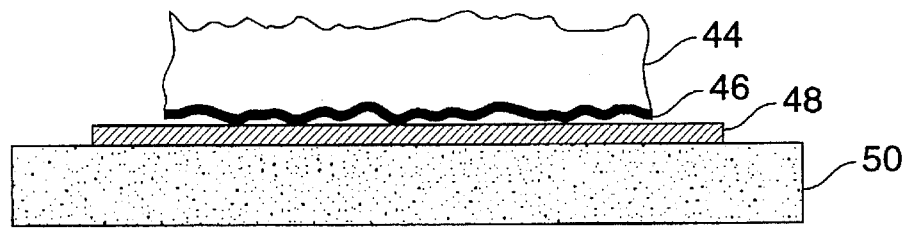
FIG. 6 is a diagram showing a thin-film sample assembly for use with the scanning force microscope shown in FIG. 5.

Preparation of a film thin enough for efficient electron transfer is an important step. If the film is prepared as a monolayer on a metal film, it is straightforward to use. Examples of such preparation methods are dipping a metal electrode into a Langmuir trough on which the sample is floated as a surfactant, and use of standard chemical methods, such as the use of alkyl-thiols on gold electrodes. Another method is to use standard electrochemical methods to deposit a thin layer onto an electrode and then to remove the electrode form the electrochemistry cell. In the most general case, the sample is a solid, possibly a section of a biological material such as a cell. In this case the standard microtome methods used for transmission electron microscopy may be used to prepare a thin film. Freezing and subsequent sectioning permits fabrication of films that are thinner than 100Å, quite routinely. Such films must then be contacted electrically. A procedure for doing this is illustrated in FIG. 6. The sample 44 is placed in an evaporator and a thin film (on the order of 20Å,) of gold 46 evaporated onto one side in order to establish a back electrode. Placed onto a clean, flat gold film, the back electrode spontaneously bonds to the underlying gold support. A suitable gold support is made by evaporating a gold film 48 of a few thousand angstroms thickness onto a mica sheet 50. This process is referred to as placing the sample surface on a conductive backing electrode.

Figure 7:
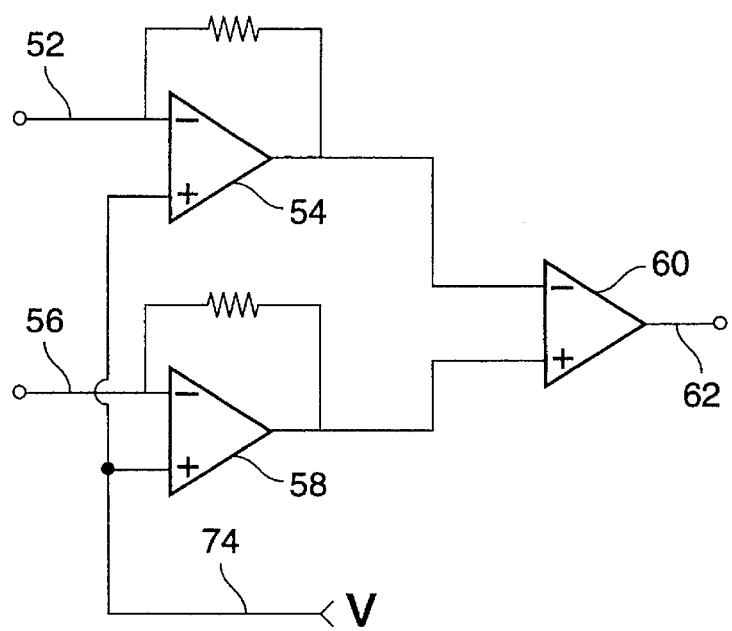
FIG. 7 is an electrical schematic diagram of the electrometer of the present invention.

The electrometer used in a preferred embodiment is shown in FIG. 7. The signal on line 52 from back electrode 30 is sent to a current-to-voltage converter 54. A "dummy" signal on line 56 from a second lead, placed in close proximity to line 52, is fed to a second, identical current to voltage converter 58. The signals from both current to voltage converters are subtracted in a differential amplifier 60 to give a final output signal 62. This arrangement cancels any common-mode noise signals that are common to the dummy signal lead and the signal lead, leading to a reduction in noise.

Figure 8:
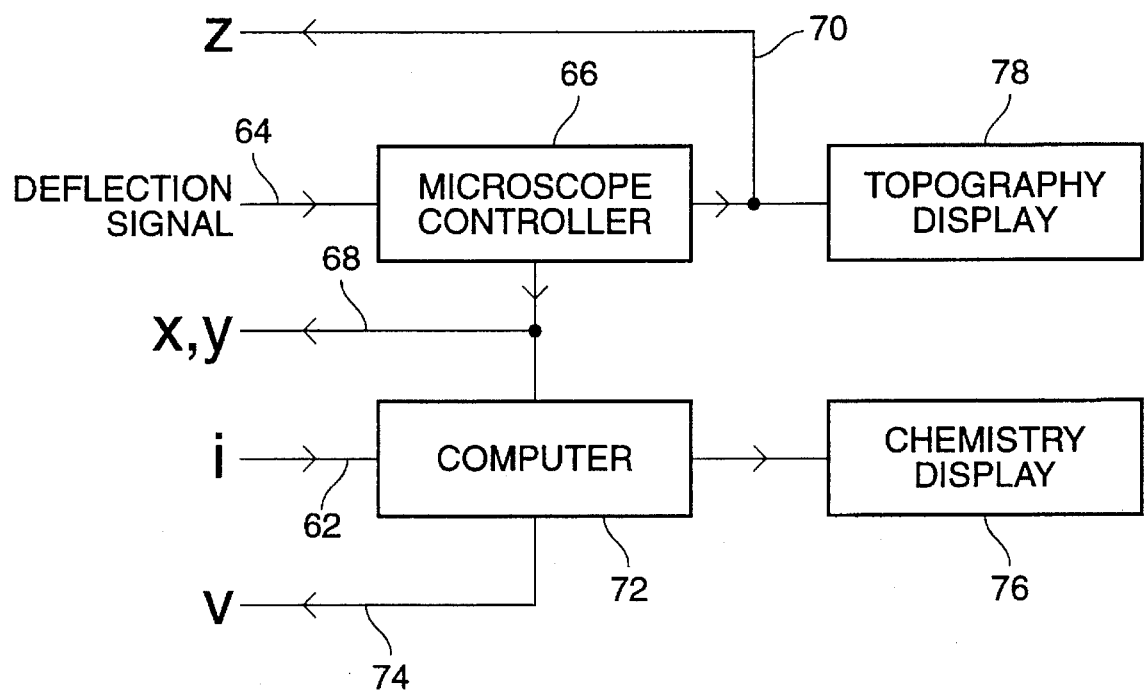
FIG. 8 is a block diagram of the control system for the microscope of FIG. 5 according to a presently preferred embodiment of the present invention.

The system is controlled as shown in FIG. 8. The signal on line 64 from the position sensitive detector 42 is sent to a conventional scanning probe microscope controller 66 (such as the NanoScope III available from Digital Instruments of Santa Barbara, Calif.) which generates the x, y raster-scan signals on line 68 that are used to position the tip 23 in the plane of the sample 26.

The signal that controls the height (z-axis) of the tip 23 is controlled by a signal on line 70 which also is used to form a topographical image of the surface of the sample 26. The signal on line 62 from the current-to-voltage converter (FIG.

7) is fed to a computer 72 (in FIG. 8) as is the x-y raster scan signal on line 68. Computer 72 also generates a series of bias voltages on line 74. On successive scans, this bias voltage is incremented. The computer 72 generates an image on the chemistry display 76 which shows the difference in current between the previous scan and the current scan as a function of the position of the tip over the surface. The computer is programmed to show larger current increments as brighter regions. In this way, regions over which increased current flow occurs at a particular voltage show up as bright patches on the screen. These voltages are correlated to known oxidation or reduction potentials in order to identify the molecules responsible for the increased brightness. Other display mechanisms may also be used as would be apparent to those of ordinary skill in the art, such as false color mapping of locations associated with relatively high measured currents—these locations, in conjunction with the bias voltage applied at the time, correlate with the presence of a particular chemical substance. A conventional topography display 78 is driven by the microscope controller 66 in a conventional manner. It is also possible to combine the topography image on display 78 and the chemistry image on chemistry display 76 to provide a single combined image showing both topography and chemical composition of the sample surface.

A certain distortion of the response occurs because the onset voltage of the reduction or oxidation process will be related to the position of the molecules in the potential gradient (electric field) between the tip and the back electrode. However, the onset for the most favorably placed molecules will still occur at a well defined potential. The net effect of this is to give a signal that is primarily sensitive to the molecules in the surface of the film. Molecules at other positions contribute to currents at higher voltage, but their spatial distribution usually broadens the current steps associated with the onset of reduction or oxidation so that sharp features are not seen. The resolution attainable with this technique is somewhat better than the radius of curvature of the coated tip (typically about 10 nm).

The current due to oxidation or reduction processes is limited by the rate at which the reduced or oxidized molecules transfer charge to the backing electrode. However, even if this is a very slow process (as in a thick sample) the current transient that results from the initial charging or discharging is still significant. To see how this can be, consider a tip contacting an area of 10 nm diameter and being swept across the surface at 20,000 nm/s (a typical speed). The tip sweeps out an area of 2E5 $nm^2$ ($2 \times 10^5$ $nm^2$) each second. If there is one electroactive molecule in each 20 by 20 angstroms of the surface and one electron is transferred, then the corresponding current is about 0.03 pA which is quite easy to detect with the electrometer of FIG. 8.

Generally, oxidation (or reduction) peaks are quite broad, that is to say, linewidths are on the order of 0.1 V. The range of voltages that can be scanned without dielecric breakdown is on the order of ±10 V. Thus, the entire useful range can be scanned with about 20 steps in voltage. For a given sample, a safe voltage range can be determined (e.g., by finding out over what range of applied bias the image appears to remain stable). Then, the area to be examined is scanned repeatedly as the tip bias is incremented in small (about 0.1 V) steps to cover the desired range of voltage. The oxidations (or reductions) will show up as distinct step-like increases in current at certain voltages. Thus, by plotting regions that showed a step-like increase in current at a particular bias potential as a color coded feature superimposed on the topography image, a combined chemical map and topographic map may be displayed. Each image takes about one minute to acquire, so the maximum acquisition time for the complete range of chemical data is about 20 minutes. The microscope described in U.S. patent application Ser. No. 08/388,068, referred to above, drifts, at most, 100Å on this timescale, rendering such a study possible on scans on the order of a micron or smaller in size.

According to another preferred embodiment of the present invention, very thin samples may be studied directly with a scanning tunneling microscope. The limitation lies with the tunnel currents that may be detected when there is no extra channel to carry current (such as oxidation or reduction). The limit is difficult to determine and depends upon the electronic properties of the organic film. There is considerable evidence that currents of a few pA can be sustained with a few volts bias across lipid-membrane films of 50Å–70Å thickness. While this restricts the range of samples that can be studied, it does include important classes of samples such as synthetic Langmuir-Blodgett films (which may be of heterogeneous composition) and natural films such as cell membranes, transferred to lie flat on a conducting substrate. The advantage of this approach lies with the generally superior resolution achieved in the STM and the higher electrochemical currents that result from reducing or oxidizing species in a thin film, because the underlying substrate serves to discharge the oxidized (or reduced) state and so enhances the current due to this process. For this purpose, a highly sensitive but conventional STM is adequate. The microscope described in U.S. patent application Ser. No. 08/388,068, referred to above, serves well for this purpose.

While illustrative embodiments and applications of this invention have been shown and described, it would be apparent to those skilled in the art that many more modifications than have been mentioned above are possible without departing from the inventive concepts set forth herein. The invention, therefore, is not to be limited except in the spirit of the appended claims.

What is claimed is:

1. A method for identifying selected chemical substances present on a surface of a sample, said method comprising the steps of:

placing the sample on a conductive backing electrode;

effecting a scan of the sample surface with a scanning probe microscope having a scanning probe;

applying a plurality of bias voltages between said backing electrode and said scanning probe during said scan, at least some of said bias voltages causing reduction or oxidation reactions in chemical substances present upon the sample surface;

measuring current flow between said scanning probe and said backing electrode while scanning the sample surface and associating said current flow with a position of said scanning probe over said sample surface;

determining for each of said plurality of bias voltages the existence of any relatively high measured current flow and said position of said scanning probe over said sample surface at the time of said relatively high measured current flow to form a datum comprising BIAS VOLTAGE and POSITION; and looking up in a table of reduction and/or oxidation potentials for each said datum said BIAS VOLTAGE to determine a chemical substance associated therewith.

2. A method according to claim 1 further comprising the step of:

displaying an image of the sample surface having superimposed thereon for each said datum at said POSITION an indicator of a chemical substance determined by said BIAS VOLTAGE.

3. A method according to claim 2 further comprising the step of:

displaying said image in two dimensions.

4. A method according to claim 2 wherein said scanning probe microscope is an atomic force microscope.

5. A method according to claim 2 wherein said scanning probe microscope is a scanning tunneling microscope.

6. A method according to claim 1 wherein said scanning probe microscope is an atomic force microscope.

7. A method according to claim 1 wherein said scanning probe microscope is a scanning tunneling microscope.

8. A method for producing a topographic image of a surface of a sample including an identification of selected chemical substances present on said sample surface, said method comprising the steps of:

placing the sample on a conductive backing electrode;

effecting a topographical scan of the sample surface to produce a map of the surface topology of the sample surface;

effecting an electrochemical scan of the sample surface with a scanning probe microscope having a scanning probe;

applying a plurality of bias voltages between said backing electrode and said scanning probe during said electrochemical scan, at least some of said bias voltages causing reduction or oxidation reactions in chemical substances present upon the sample surface;

measuring current flow between said scanning probe and said backing electrode while scanning the sample surface and associating said current flow with a position of said scanning probe over said sample surface;

determining for each of said plurality of bias voltages the existence of any relatively high measured current flow and said position of said scanning probe over said sample surface at the time of said relatively high measured current flow to form a datum comprising BIAS VOLTAGE and POSITION;

looking up in a table of reduction and/or oxidation potentials for each said datum said BIAS VOLTAGE to determine a chemical substance associated therewith; and displaying an image of the sample surface comprising said map of the surface topology of the sample surface having superimposed thereon for each said datum at said POSITION an indicator of a chemical substance determined by said BIAS VOLTAGE.

9. A method according to claim 8 wherein said indicator is a false color and each of a selected number of chemical substances has associated therewith a particular color.

10. A method according to claim 8 wherein said scanning probe microscope is an atomic force microscope.

11. A method according to claim 8 wherein said scanning probe microscope is a scanning tunneling microscope.

12. An electrochemical scanning probe microscope for determining the existence and location of selected chemical substances on a surface of a sample disposed on a conductive backing electrode, said electrochemical scanning probe microscope comprising:

a conductive scanning probe tip;

bias voltage means for applying a plurality of bias voltages between said scanning probe tip and the backing electrode;

current measuring means for measuring current flow between said scanning probe tip and the backing electrode;

reaction detection means for determining current flow associated with oxidation or reduction reactions taking place on the sample surface immediately adjacent said scanning probe tip;

position sensing means for determining a position of said scanning probe tip over the sample surface; and storage means for recording information indicative of said position and a bias voltage associated with said oxidation or reduction reactions detected by said reaction detecting means.

13. An electrochemical scanning probe microscope according to claim 12, further comprising: identification means for determining a chemical substance associated with said position and bias voltage in said storage means.

14. An electrochemical scanning probe microscope according to claim 13, further comprising:

chemical display means for displaying a chemical image of the sample surface having superimposed thereon an indication of positions and identities of chemicals identified by said identification means.

15. An electrochemical scanning probe microscope according to claim 14, further comprising:

topographical display means for displaying a topographical image of the sample surface.

16. An electrochemical scanning probe microscope according to claim 15, further comprising:

combined display means for displaying said topographical image having superimposed thereon said chemical image.

17. An electrochemical scanning probe microscope according to claim 12 wherein said scanning probe microscope is an atomic force microscope.

18. An electrochemical scanning probe microscope according to claim 17 wherein said conductive scanning probe tip is grounded.

19. An electrochemical scanning probe microscope according to claim 12 wherein said scanning probe microscope is a scanning tunneling microscope.

20. An electrochemical scanning probe microscope according to claim 12 further comprising means for cancelling common mode noise.

21. An electrochemical scanning probe microscope for determining the existence and location of selected chemical substances on a surface of a sample disposed on a conductive backing electrode, said electrochemical scanning probe microscope comprising:

a conductive scanning probe tip;

bias voltage means for applying a plurality of bias voltages between said scanning probe tip and the backing electrode;

current measuring means for measuring current flow between said scanning probe tip and the backing electrode;

reaction detection means for determining current flow associated with oxidation or reduction reactions taking place on the sample surface immediately adjacent said scanning probe tip;

position sensing means for determining a position of said scanning probe tip over the sample surface; and identification means for determining a chemical substance associated with said oxidation or reduction reactions detected by said reaction detection means.

22. An electrochemical scanning probe microscope according to claim 21, further comprising:

chemical display means responsive to said position sensing means and said identification means for displaying a chemical image of the sample surface having superimposed thereon an indication of identities of chemicals identified by said identification means at positions determined by said position sensing means.

23. An electrochemical scanning probe microscope according to claim 22, further comprising:

topographical display means for displaying a topographical image of the sample surface.

24. An electrochemical scanning probe microscope according to claim 23, further comprising:

combined display means for displaying said topographical image having superimposed thereon said chemical image.

25. An electrochemical scanning probe microscope according to claim 21 wherein said scanning probe microscope is an atomic force microscope.

26. An electrochemical scanning probe microscope according to claim 25 wherein said conductive scanning probe tip is grounded.

27. An electrochemical scanning probe microscope according to claim 21 wherein said scanning probe microscope is a scanning tunneling microscope.

28. An electrochemical scanning probe microscope according to claim 21 further comprising means for cancelling common mode noise.

* * * * *

UNITED STATES PATENT AND TRADEMARK OFFICE
CERTIFICATE OF CORRECTION

PATENT NO. : 5,495,109
DATED : February 27, 1996
INVENTOR(S) : Stuart M. Lindsay, Tianwei Jing It is certified that error appears in the above-indentified patent and that said Letters Patent is hereby corrected as shown below:

Column 5, line 36, replace "angstores" with --angstroms--.

Column 7, line 56, replace "dielecric" with --dielectric--.

Signed and Sealed this

Twenty-ninth Day of October 1996

Attest:

BRUCE LEHMAN

*Attesting Officer*     *Commissioner of Patents and Trademarks*